Dec. 18, 1923.
M. SIMON
ELECTRICAL HEATING UNIT
Original Filed April 25, 1921
1,477,602
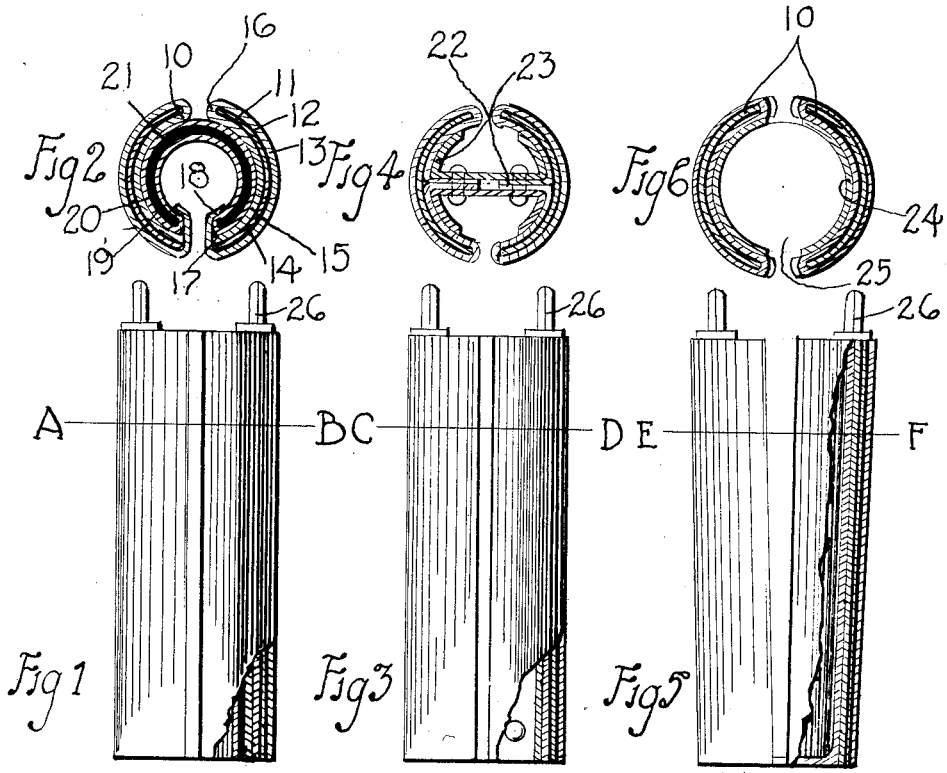
Maurice Simon INVENTOR.
BY Roy M. Eilers ATTORNEY.

Patented Dec. 18, 1923.

1,477,602

UNITED STATES PATENT OFFICE.

MAURICE SIMON, ST. LOUIS, MISSOURI.

ELECTRICAL HEATING UNIT.

Application filed April 25, 1921, Serial No. 464,202. Renewed May 5, 1923.

*To all whom it may concern:*

Be it known that I, MAURICE SIMON, a citizen of the United States, residing in the city of St. Louis, in the State of Missouri, have invented a certain new and useful Electrical Heating Unit, of which the following is a clear, full, and exact description, such as will enable others skilled in the art to make and use the same.

My invention consists in the construction and arrangement of parts hereinafter described and particularly pointed out in the claims. In describing the various arrangements employed and shown in the drawings hereto attached and described in the specification, I do not limit my invention to the precise form or construction of apparatus shown, or the several parts thereto, inasmuch as various alterations may be made without changing the scope of my invention.

In application Serial No. 464,201, I have shown an electrical heating unit with a casing adapted to make effective contact with a body to be heated. In this application I use a spring to make such contact and in application Serial No. 464,203 I use manually controlled means for this purpose.

In the drawings Fig. 1 is an elevational view of a heating unit embodying my invention with a portion broken out to show the interior arrangement thereof. Fig. 2 is a cross sectional view of the heating unit on the line A—B in Fig. 1. Fig. 3 is a modified form of heating unit likewise having a portion broken out to show the interior arrangement thereof. Fig. 4 is a cross-sectional view of the heating unit on the line C—D in Fig. 3. Fig. 5 is an elevational view of another modified form of heating unit with a portion broken out to show the interior arrangement thereof. Fig. 6 is a cross sectional view of the heating unit shown in Fig. 5, on the line E—F in that figure.

In the drawings 10 is a resistor comprising a resistance element 11 and insulation 12. 13 is a casing of heat conducting material preferably of copper and preferably having double walls, as shown in the drawings. 14 is an outer wall and 15 is an inner wall. 16 are the ends of the casing which are preferably rounded. In Figures 1 and 2, the casing is shown, formed from a sheet of metal. One edge of the metal is shown at 17 and the other edge is shown at 18. 19 is a heat resisting spring element comprising a continuous double walled open seam member 20, preferably having the form of an open seam cylinder. 21 is a heat resisting material, such as mica, compressed within the double walled member 20. In Figures 3 and 4, the edges of the 22 of the casing are attached to the springs 23. In Figures 5 and 6, the two resistors 10 are positioned on the arms 24 of a U-shaped spring 25. 26 are terminals. These heating units are designed to be inserted into apertures of objects to be heated. The heating units shown in Figures 1 and 5 however, also may be slipped over and upon objects of suitable form which are to be heated. By reason of the springs the casing of the resistor is pressed against the walls of the object to be heated, so that a good thermal contact is obtained. The spring shown in Figure 1 is preferably formed from a seamless copper tube. After flattening the tube a heat resisting material such as mica is inserted between the flattened walls of the tube and the walls are compressed upon the mica. The spring is then formed in the desired shapes, preferably that of an open-seam cylinder.

I claim:

1. In an electrical heating unit the combination of an electrical resistor, a casing of heat conducting material therefor, and a spring adapted to press the casing against an object to be heated.

2. In an electrical heating unit, the combination of an electrical resistor, a casing of heat conducting material therefor and a spring adapted to press the casing against the inner periphery of an object to be heated.

3. In an electrical heating unit a spring, an electrical heating unit carried thereby, and a casing of heat conducting material on the electrical resistor; the spring being arranged to press the casing against the inner periphery of an object to be heated so as to secure a good thermal-contact therewith.

4. In an electrical heating unit a spring of a continuous heat conducting material a heat resisting material compressed within the wall of said spring, an electrical resistor, a casing therefor; which casing is adapted to be pressed by the spring against an object to be heated.

5. An electrical heating unit comprising a spring, an electrical resistor intermediately positioned on said spring, and a casing of heat conducting material about said resistor.

6. An article of manufacture comprising a resilient double wall open seam cylinder of heat conducting material and a heat resisting material within and compressed by the walls of the cylinder.

7. An article of manufacture comprising a resilient continuous double walled member of heat conducting material, and heat resisting material within and compressed by the walls of said member.

MAURICE SIMON.